US008253058B2

(12) United States Patent
Zehavi

(10) Patent No.: US 8,253,058 B2
(45) Date of Patent: Aug. 28, 2012

(54) HYBRID NOZZLE FOR PLASMA SPRAYING SILICON

(75) Inventor: Raanan Zehavi, Sunnyvale, CA (US)

(73) Assignee: Integrated Photovoltaics, Incorporated, San Jose, CA (US)

( * ) Notice: Subject to any disclaimer, the term of this patent is extended or adjusted under 35 U.S.C. 154(b) by 283 days.

(21) Appl. No.: 12/720,153

(22) Filed: Mar. 9, 2010

(65) Prior Publication Data

US 2010/0237050 A1 Sep. 23, 2010

Related U.S. Application Data

(60) Provisional application No. 61/161,495, filed on Mar. 19, 2009.

(51) Int. Cl.
*B23K 10/00* (2006.01)

(52) U.S. Cl. ........... 219/121.47; 219/121.5; 219/121.52; 219/76.16

(58) Field of Classification Search ............. 219/121.52, 219/121.48, 121.43, 121.47, 76.16, 76.15, 219/121.5; 118/723 R, 723 I; 156/345.34, 156/345.45, 345.47

See application file for complete search history.

(56) References Cited

U.S. PATENT DOCUMENTS 4,003,770 A 1/1977 Janowiecki
4,077,818 A * 3/1978 Chu ................................ 438/89
4,377,564 A * 3/1983 Dahlberg ...................... 423/349
4,427,516 A 1/1984 Levinstein
4,449,286 A 5/1984 Dahlberg
4,661,335 A 4/1987 Boudot
4,691,866 A 9/1987 Belk
5,022,979 A * 6/1991 Hijikata et al. .......... 204/298.33
5,164,138 A 11/1992 Dietl
5,211,761 A 5/1993 Noguchi
5,254,359 A * 10/1993 Zurecki et al. ................ 427/449
5,332,601 A 7/1994 Varacalle
5,679,167 A 10/1997 Muehlberger
5,798,137 A 8/1998 Lord
5,837,959 A 11/1998 Muehlberger
5,897,059 A 4/1999 Muller
6,137,078 A 10/2000 Keller
6,386,140 B1 5/2002 Muller
6,570,906 B2 * 5/2003 Titus .............................. 373/29
6,581,415 B2 6/2003 Chandra
7,109,072 B2 9/2006 Sato
7,759,599 B2 7/2010 Hawley
7,789,331 B2 9/2010 Zehavi
2002/0187647 A1 * 12/2002 Dhindsa et al. ............... 438/710
2005/0045593 A1 * 3/2005 Ren et al. ........................ 216/83

(Continued)

OTHER PUBLICATIONS

Sulzer Metco, "HVOF Advanced Technology Solutions and Services"; 2005; www.sulzermetco.com.

(Continued)

*Primary Examiner* — Mark Paschall

(74) *Attorney, Agent, or Firm* — Fernandez & Associates, LLP

(57) ABSTRACT

A hybrid nozzle for use in a plasma spray gun, especially for plasma spraying silicon to form semiconductor devices such as solar cell. The outlet of the gun includes a two-piece annular electrode against which the plasma is ignited and through which the plasma plume exits the gun together with entrained silicon. In one embodiment, the upstream part is composed of graphite to allow ignition of the plasma and the downstream part is composed of pure silicon. In another aspect, the silicon feedstock is injected into the plasma plume through ports formed through the silicon part.

7 Claims, 3 Drawing Sheets

U.S. PATENT DOCUMENTS

| | | | |
|---|---|---|---|
| 2005/0129603 A1 | 6/2005 | Szillat | |
| 2006/0211218 A1 | 9/2006 | Boyle et al. | |
| 2008/0057212 A1 | 3/2008 | Dorier | |
| 2008/0092920 A1* | 4/2008 | Shih et al. | 134/1 |
| 2008/0220558 A1 | 9/2008 | Zehavi | |
| 2010/0237050 A1 | 9/2010 | Zehavi | |
| 2010/0243963 A1 | 9/2010 | Zehavi | |
| 2010/0304035 A1 | 12/2010 | Zehavi | |
| 2011/0041903 A1 | 2/2011 | Zehavi | |
| 2011/0045630 A1 | 2/2011 | Zehavi | |

OTHER PUBLICATIONS

Sulzer Metco, "Atmospheric Plasma Spray Solutions"; Nov. 2006; www.sulzermetco.com.

Sulzer Metco, "Thermal Spray Equipment Guide"; Issue 8 2010; www.sulzermetco.com.

Sulzer Metco, "F4-MB Product Data Sheet"; Issue 2, 2004; www.sulzermetco.com.

Sulzer Metco, "Thermal Spray Materials Guide"; Jun. 2010; www.sulzermetco.com.

Klepper, et al., "Vacuum Arc Deposited Boron Carbide Films for Fusion Plasma Facing Components", Fusion Technology, 39, Mar. 2, 2001, 910.

Harris, W.J.; "A Study of Cathode Erosion in High Power Arcjets"; PhD Thesis, Texas Tech University, May 2002.

Trelles, J.P., et al.; "Simulation Results of Arc Behavior in Different Plasma Spray Torches"; Univ. of Minnesota, 2006.

Sulzer Metco, "9MB Plasma Spray Guns—Instructions"; May 27, 2004; Instruction G37404, Issue e; SAP # MAN 40351 EN 05.

Akani, M., et al.; "Influence of process parameters on the electrical properties of plasma-sprayed silicon"; J.Appl. Phys. 60, 1, Jul. 1, 1986.

Suryanarayanan, R., "Plasma Spray Applications for Electronic Materials"; Plasma Spraying, Theory and Applications; World Scientific; ISBN 981-02-1363-8, 1993, 217.

Pawlowski, L. ;"The Science and Engineering of Thermal Spray Coatings," John Wiley (1995 1st Edition), 2nd Edition 2008 ISBN 978-0-471-49049-4.

* cited by examiner

HYBRID NOZZLE FOR PLASMA SPRAYING SILICON

RELATED APPLICATION

This application claims benefit of provisional application 61/161,495, filed Mar. 19, 2009, incorporated herein by reference.

FIELD OF THE INVENTION

The invention relates generally to plasma spraying. In particular, it relates to a plasma gun capable of spraying high purity silicon suitable for forming solar cells and other semiconductor devices.

BACKGROUND ART

Several suggestions exist in the prior art for depositing a layer of silicon by plasma spraying to form silicon semiconductor circuits including silicon solar cells. Solar cells formed by plasma spraying have the advantage that they do not need to be as perfect as monocrystalline silicon used for forming integrated circuits. Plasma spraying allows the formation of solar cells on nearly arbitrary substrates, such as graphite, as described by Chu in U.S. Pat. No. 4,077,818. Nonetheless, plasma spraying of semiconductor circuits, even solar cells, has never achieved widespread acceptance although operable sprayed solar cells have been reported.

SUMMARY OF THE INVENTION

According to one embodiment, a hybrid nozzle for a plasma gun useful for plasma spraying silicon includes a silicon cap or liner having an axial passage forming the nozzle orifice of the gun and a highly conductive insert, such as graphite, positioned upstream from the silicon member to facilitate ignition of the plasma of the sputter working gas flowing through the liner and the silicon cap. The silicon cap and insert may be tightly fit in a highly conductive housing such as copper, which provides both cooling and electrical power to ignite and support the plasma. Thereby, the plasma is not exposed to heavy metals such as copper or iron-containing stainless steel and the most sensitive portion of the gun is composed of silicon to thereby not contaminate the silicon entrained in the working gas.

In an alternative embodiment of the invention, the silicon part may be replaced by graphite or the graphite part may be replaced by a non-contaminating metal other than silicon. In yet another embodiment, both nozzle parts may be replaced by an integral part of graphite or silicon carbide. The silicon feed stock may be injected into the gun down stream from the nozzle beyond the orifice of the nozzle. On the other hand, in one embodiment, the feed stock is injected into the gas stream within the silicon portion of the nozzle, preferably through two or more feed ports equi-angularly arranged around the nozzle. Silicon injectors in the feed ports may pass through both the silicon nozzle and the copper cooling housing to which the two liners are thermally sunk. The feed stock may be a mixed feed stock of silicon powder and a silicon-forming fluid, such as liquid silane.

DETAILED DESCRIPTION OF THE PREFERRED EMBODIMENTS

Figure 1:
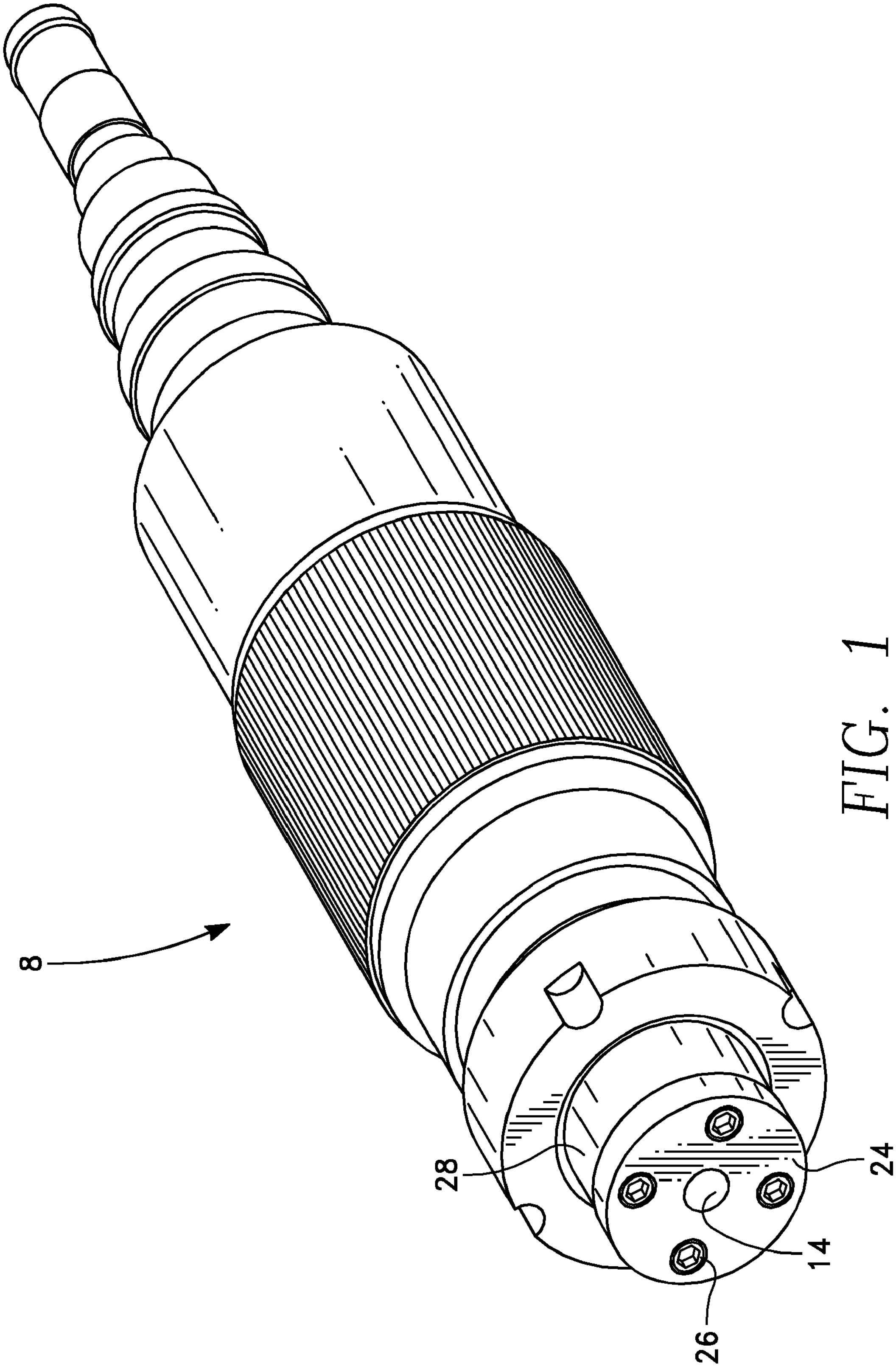
FIG. 1 is an orthographic view of a plasma gun into which a hybrid nozzle of the invention may be incorporated.

It is believed that the generally poor results for conventionally plasma sprayed solar cells result at least in part from the fact that most plasma spray guns are designed with parts facing the plasma composed of copper or brass because of the need for high electrical and thermal conductivity in maintaining the plasma and cooling the plasma facing walls of the gun. It is believed that the copper and other components of the plasma gun inevitably contaminate the silicon being sprayed and seriously degrade the semiconducting properties of the spray silicon. Copper is known to seriously degrade silicon semiconductivity. Commercially available copper nozzles are coated on the inside with tungsten, but they still produce poor results. Stainless steel offers little improvement because iron is also a serious contaminant for silicon semiconductivity In U.S. patent application Ser. No. 12/074,651, now published as U.S. published patent application 2008/0220558, incorporated herein by reference, Zehavi (the present inventor) and Boyle proposed that one or both of the anode and cathode of a DC plasma gun be composed of elemental silicon so that any silicon sputtered from the electrodes not seriously degrade the plasma sprayed silicon.

However, implementing this approach has proven difficult. It is generally observed that the silicon anode fractures and typically explodes immediately after ignition of the plasma. Although the invention is not bound by the present understanding of the theory for this result, it is believed that the fracturing results from the generally low electrical conductivity of even heavily doped silicon, the somewhat small decrease of electrical conductivity with temperature, and the low thermal conductivity of silicon. Ignition begins by applying a high-voltage, low-current RF voltage signal between the anode and cathode, which over a few seconds forms an arc in the spraying gas between the narrowest portion of the gap between them. The power is then switched to a lower voltage high-current DC current-regulated supply, for example, 350 amps at an initial voltage of 100V. The current forms a DC current path through the electrode and the plasma now occupying the gap. In normal circumstances over a few seconds, the plasma stabilizes, the voltage drops, and the plasma expands away from the narrow gap and out the nozzle to form the plasma plume or flame. However, the high current from a small localized breakdown in the gas adjacent the anode is focused to that area of anode. The initial current path through the silicon anode is likely to be a filamentary conduction path, which contrary to behavior in a metal anode does not readily spread to the surrounding silicon. The filament greatly heats up a small volume of the silicon and the resultant thermal expansion relative to the significantly cooler surrounding silicon cause the silicon to fracture.

According to one aspect of the invention, the spray gun nozzle including the anode of the DC plasma gun is divided into two parts facing the stream of working gas.

The inner part immediately facing the cathode is used in igniting the plasma. It is composed of graphite or other highly conductive material other than semiconducting silicon. One alternative is doped silicon carbide (SiC). After the plasma is ignited, the plasma moves away from narrow gap and out the orifice of the nozzle and forms a flame directed to the work piece.

The electron current from the plasma is sunk at least in part by the portion of the graphite anode away from the narrow gap. In this embodiment, the outer part of the nozzle, on the other hand, is composed of high purity silicon. Either there is relatively little current to the silicon part of the nozzle or the current of the already excited plasma is relatively evenly spread over the area of the silicon nozzle, thereby avoiding the filamentary effect.

Figure 2:
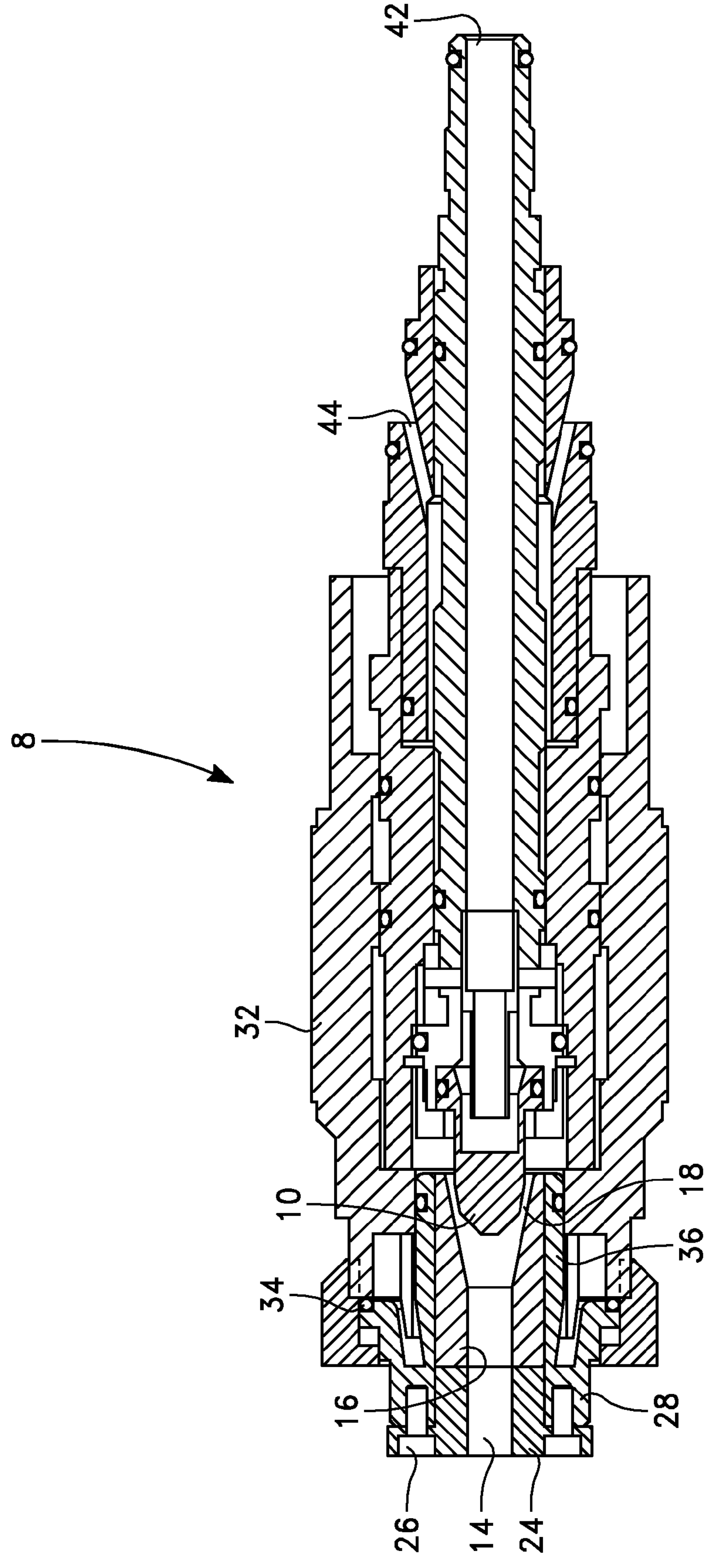
FIG. 2 is a cross-sectional view of the plasma gun of FIG. 1 including a first embodiment of a hybrid nozzle of the invention.

A plasma gun 8 is illustrated in the orthographic view of FIG. 1 and the cross-sectional view of FIG. 2. Such a gun before modification for the invention and associated support equipment including power supplies are commercially available from Sulzer Metco of Westbury, N.Y. as model F4-MB. It is more fully described in application publication 2008/0220558. The spraying gas, typically argon, is injected into the gun, is excited into a plasma, and is ejected through a nozzle orifice 14 as a plasma flame. In one embodiment, the silicon powder is transversely injected into the ejected plasma flame downstream from the orifice 14, as described in the published application. The injected power is both entrained and liquefied or perhaps vaporized in the plasma flame for coating of the work piece.

Figure 3:
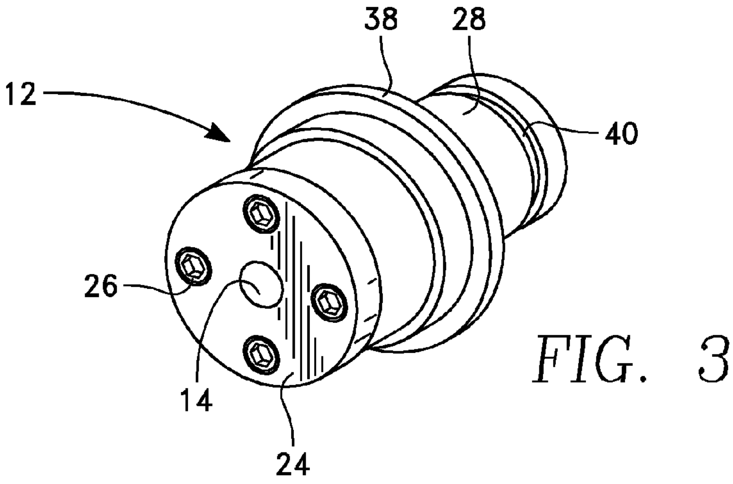
FIG. 3 is an orthographic view of the hybrid nozzle included in the plasma gun of FIG. 2.
Figure 4:
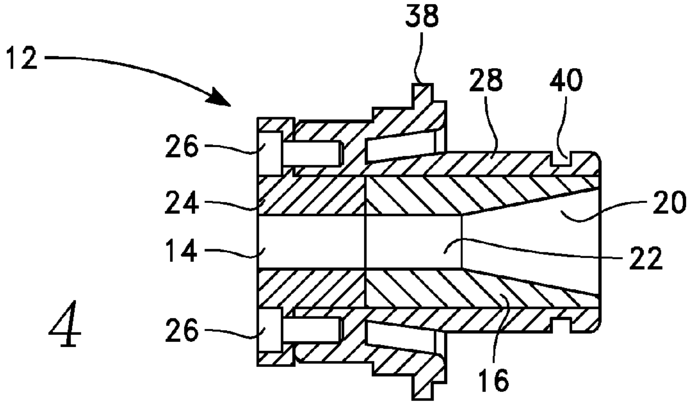
FIG. 4 is a cross-sectional view of the hybrid nozzle of FIG. 3.

The plasma gun 8 includes a generally conically shaped cathode 10 and acting as an anode a hybrid nozzle 12, illustrated in more detail in the orthographic view of FIG. 3 and the cross-sectional view of FIG. 4. The cathode 10 may be composed of tungsten or other highly conductive and heat resistant material. The anode is formed in the nozzle 12 having the orifice 14 through which the plasma is ejected. In this embodiment, the nozzle 12 includes a graphite liner 16 facing the conical cathode 10 across a small annular gap 18 through which the spraying gas flows and across which the gas is initially excited into an arc by the high-voltage RF. After ignition, the power supply changes to DC to convert the plasma into a DC plasma. The graphite liner 16 includes a tapered portion 20 inwardly tapered in the downstream direction and disposed adjacent the cathode 10 and a connected right cylindrical portion 22. After the DC plasma is ignited, the remaining portions of the graphite insert 16 closer to the orifice 14 act to sink the plasma electron current.

The anode also includes a silicon cap 24 forming the cylindrically shaped nozzle orifice 14 and connected cylindrical bore within it of the same diameter as the cylindrical portion 22 the liner 16 through which flows the excited gas from the annular gap 18 and out the orifice 14. As illustrated, the diameter of the orifice 14 and bore is greater than twice and preferably greater than four times the thickness of the gap 18. The cap 24 is formed of high-purity semiconducting silicon, for example, virgin polysilicon, also called electronic grade silicon. The virgin polysilicon is machined according to the procedures described by Boyle et al. in U.S. Pat. Nos. 6,205,993 and 6,450,346.

In operation, high voltage RF power is initially applied between the cathode 10 and the graphite liner 16 of the anode or more precisely to the housing in which it is closely fit. After an RF arc has formed across the narrow gap 18, the anode 16 is DC biased negatively with respect to the cathode to form a more uniform plasma with associated plasma sheaths at the anode 16 and cathode 10. The plasma azimuthally smoothes and then extends axially as its positive end migrates down toward the orifice 14 and out towards the workpiece. The composition of the flame is not completely understood. It may have been converted back to un-ionized but very hot, high-velocity gas. The silicon powder is entrained in the flame and melted and possibly vaporized. See, for example, U.S. Pat. No. 5,858,470 to Bernecki et al. and published application 2008/0220558.

Mounting screws 26 detachably connect the silicon cap 24 to a copper or brass nozzle housing 28, which is held by a retaining ring to a gun housing 32 and sealed to it on opposite ends by 0-rings 34, 36, the former held against an annular ledge 38 and the latter held in an annular groove 40 in the nozzle housing 28. Either composition of the nozzle housing 28 includes copper, which is very deleterious for semiconducting silicon. According to this aspect of the invention, the housing 28 is lined with materials much less harmful to semiconductivity. The silicon cap 24 and graphite liner 16 are fit tightly inside the nozzle housing 28, which in turn is tightly coupled to the gun housing 32 to promote thermal transfer. The gun housing 32 has water cooling channels including a large central supply bore 42 formed therein for cooling the nozzle housing 28 and hence the graphite insert 16 and the silicon cap 24 closely fit within the nozzle housing 28. The silicon cap 24 is preferably kept relatively cool, for example, below 600° C. although its melting temperature is about 1400° C. so higher temperatures are possible.

The cooling of the graphite liner 16 is less important since carbon sublimes above 3000° C. Spraying gas, such as argon, is injected into inlets 44 formed in the gun housing 32 from a gas supply line vacuum fitted to the gun housing 32. The spraying gas is directed to the annular gap 18 formed between the cathode 10 and the anode or graphite liner 16. The plasma of the spraying gas is ejected through the orifice 14 from the gun 8.

A series of experiments were performed to plasma spray silicon onto a substrate, which were silicon wafers during the tests to remove ambiguities arising from other materials for the substrates. Different types of nozzles were tested. Although other types of silicon powder may be used, it is preferred that the silicon powder either be jet milled in the jet mill described by myself and Boyle in U.S. patent application publication 2008/0054106 or be milled and crushed from high-purity silicon pellets using non-contaminating rollers, as is described in provisional application 61/165,218, filed Mar. 31, 2009. The sprayed silicon films were then analyzed by ICP-MS (inductively coupled plasma mass spectrometry) for a large number of impurities important in semiconductor processing. The measured impurity levels in parts per million by weight are given in TABLE 1.

| Element | Copper | Molybdenum | Graphite |
|---|---|---|---|
| Al | 7.5 | 2 | 2.5 |
| Sb | | | 0.05 |
| As | | | |
| Ba | 0.4 | 0.1 | |
| Cd | | | |
| Ca | | | |
| Cr | | | |
| Co | | | |
| Cu | 7.2 | 7.3 | |
| Ga | | | |
| Ge | | | |
| Fe | 16 | 6 | 4 |
| Pb | 0.4 | 0.3 | 0.1 |
| Li | | | |
| Mg | 12 | 7.9 | 0.1 |
| Mn | | | 0.3 |
| Mo | | | |
| Ni | 2.3 | 1 | 0.4 |

-continued

| Element | Copper | Molybdenum | Graphite |
|---|---|---|---|
| K | | | |
| Na | 8.1 | 8.3 | 1.1 |
| Sr | 0.4 | 0.1 | 0.05 |
| Sn | | | |
| V | | | 0.02 |
| Zn | 26 | 15 | 3.1 |
| Zr | | | |

The first column lists the element being detected. The second column lists the impurities for an OEM copper nozzle with a tungsten liner but no other insert; the third column, for a molybdenum insert; the fourth column for a graphite insert. Blank entries indicate test results below the detection limits of the measurement, no more than 0.5 ppm for all elements except for Ca, which was 10 ppm. The limit for copper was 0.2 ppm. The inserts were an integral forms of the cap 24 and insert 18 of the figures. That is, there was no separate silicon cap. These preliminary results show that use of a graphite insert eliminated copper and substantially decreased iron and lead. The results for a molybdenum insert are not completely understood.

From the results above, use of a one-piece graphite insert alone may be sufficient. High purity silicon carbide is expected to also work as either the separated insert in combination with a silicon cap or as a one-piece insert. Although preliminary results for molybdenum are not favorable, it is possible that 1 molybdenum can be used for a one-piece insert or the back part of a two-piece insert. The use of a silicon cap or liner is expected to improve these results further. Silicon carbide caps in combination with graphite inserts are also expected to be effective.

Figure 5:
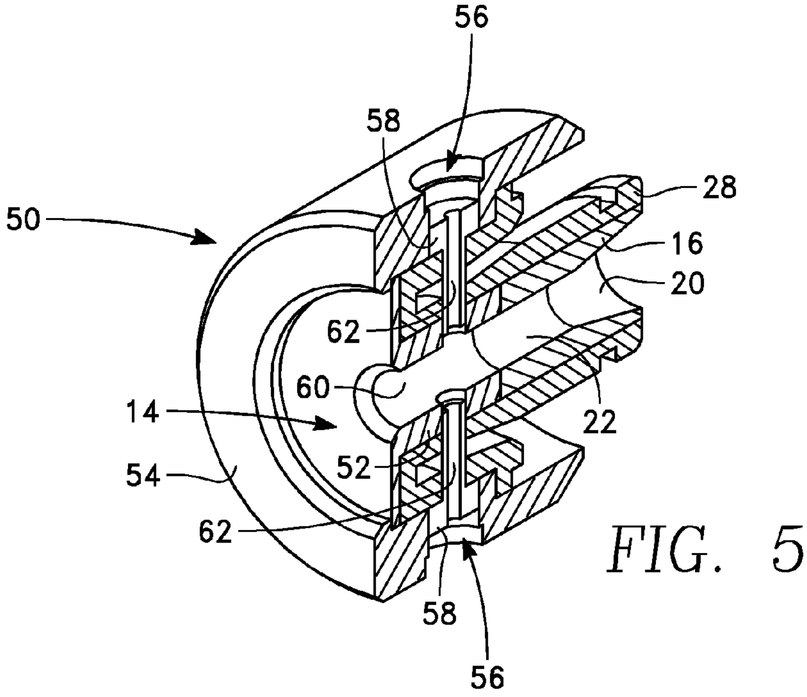
FIG. 5 is a sectioned orthographic view of a second embodiment of a hybrid nozzle.

An alternative hybrid nozzle 50, illustrated in the sectioned orthographic view of FIG. 5 is adapted to inject the silicon feed stock into the nozzle 50. The internal injection avoids the problem that when silicon powder, especially of small size, is injected transversely into a rapidly moving plasma plume outside the gun, a substantial portion of the powder bounces off the plume and is wasted. The internally injected hybrid nozzle 50 includes the graphite liner 16 and a silicon liner 52 held in the copper nozzle housing 28 by a retainer ring 54 held to the nozzle housing 28 by unillustrated screws. This embodiment replaces the silicon cap 24 of the previous embodiment, which acts as a liner, with the silicon liner 52 and retainer ring 54, which can be more economically made of copper. Two feed ports 56 formed through opposed side walls of the retainer ring 54 accommodate injectors 58 passing through the sides of the silicon liner 14 into cylindrical bore 60. Preferably, the injectors 58 are also made of high-purity silicon. The feed stock is fed into central bores 62 of the injectors 58 to be injected into the plasma confined within the cylindrical bore 60 of the silicon liner 14. Any injected silicon powder which bounces off the plasma plume within the silicon liner 14 is likely to strike the silicon liner 14 and be redirected back into the plasma plume. However, because of the high-purity silicon composition of the silicon liner 14, no impurities are introduced into the plasma during the high-velocity redirection. The opposed feed ports reduce the asymmetry introduced into the plasma plume by the injection process. More than two feed ports positioned at equal angular spacing around the central bore 60 will further reduce the asymmetry.

Feed stock utilization is further increased if a mixed silicon feed stock is fed into the injectors 62, as is described in more detailed in provisional application 61/305,796 filed Feb. 18, 2010, incorporated herein by reference. The mixed feed stock includes both silicon powder and a silicon-forming fluid, for example, liquid silane. The mixed feed stock allows the use of finer silicon powder since the powder is entrained in the fluid silicon precursor. The finer silicon powder produces less damage to the silicon parts of the plasma gun, thus increasing the life time of gun parts and decreasing the cost of operating the gun. The invention thus allows plasma spraying of semiconductor grade silicon with a straightforward and inexpensive modification of a conventional plasma gun nozzle. Further, the simple structure of the silicon liner allows its quick exchange with an inexpensive replacement silicon liner.

The invention claimed is:

1. A plasma spray gun for plasma spraying silicon, comprising:

a cathode; and an anode having an inner first part facing on a radially inner side the cathode across a gap, said gap having a predetermined thickness, and a second part having an inner bore forming an outlet orifice of the plasma spray gun of a diameter at least twice as large as the gap thickness between the cathode and the first part of the anode and connected thereto, the gap and inner bore being connected to a gas inlet; wherein the second part consists of silicon and the first part consists of graphite such that the second part is removed from the cathode by at least the diameter of the inner bore.

2. The plasma spray gun of claim 1, further comprising a plurality of feedstock ports radially penetrating and circumferentially arranged around the second part.

3. A plasma spray gun, for plasma spraying silicon, comprising:

a cathode; and an anode comprising an inner first part facing on a radially inner side the cathode across a gap, said gap having a predetermined thickness, and consisting of graphite and a second part having an inner bore forming an outlet orifice of the gun of a diameter at least twice as large as the gap thickness and connected thereto and consisting of silicon, the gap and bore being connected to a gas inlet.

4. The plasma spray gun of claim 3, further comprising a plurality of feedstock ports radially penetrating and circumferentially arranged around the second part.

5. The plasma spray gun of claim 4, wherein the feedstock ports include respective injectors having axial bores and consisting of silicon passing through the second part.

6. A plasma spray gun for plasma spraying silicon, comprising:

a cathode; and an anode having an inner first part facing on a radially inner side the cathode across a gap, said gap having a predetermined thickness, and a second part having an inner bore forming an outlet orifice of the gun of a diameter at least twice as large as the gap thickness and connected thereto, the gap and bore being connected to a gas inlet, the the first part of the anode consisting of graphite or molybdenum; the second part of the anode consisting of silicon, silicon carbide, or molybdenum.

7. The plasma spray gun of claim 6 further comprising a plurality of feedstock ports radially penetrating and circumferentially arranged around the second part.

* * * * *